United States Patent
Thompson et al.

(10) Patent No.: US 9,188,021 B2
(45) Date of Patent: Nov. 17, 2015

(54) STEAM TURBINE BLADE VIBRATION MONITOR BACKPRESSURE LIMITING SYSTEM AND METHOD

(71) Applicants: Edward David Thompson, Casselberry, FL (US); Michael Twerdochlib, Oviedo, FL (US)

(72) Inventors: Edward David Thompson, Casselberry, FL (US); Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 214 days.

(21) Appl. No.: 14/077,571

(22) Filed: Nov. 12, 2013

(65) Prior Publication Data

US 2015/0128596 A1    May 14, 2015

(51) Int. Cl.
| | |
|---|---|
| F01K 13/02 | (2006.01) |
| F01K 7/06 | (2006.01) |
| F01D 21/14 | (2006.01) |
| F01D 25/04 | (2006.01) |
| F01D 25/06 | (2006.01) |
| F01K 7/04 | (2006.01) |
| F01K 7/14 | (2006.01) |
| F01K 7/24 | (2006.01) |

(52) U.S. Cl.
CPC .............. *F01D 21/14* (2013.01); *F01D 25/04* (2013.01); *F01D 25/06* (2013.01); *F01K 7/04* (2013.01); *F01K 7/14* (2013.01); *F01K 7/24* (2013.01); *F01K 13/02* (2013.01); *F05D 2270/334* (2013.01); *F05D 2270/803* (2013.01)

(58) Field of Classification Search
CPC ......... F01D 21/14; F01D 25/06; F01D 25/04; F01K 7/24; F01K 7/14; F01K 13/02; F01K 7/04; F05D 2270/803; F05D 2270/334

USPC .......... 60/646, 657, 660, 662, 663, 664, 667, 60/677
See application file for complete search history.

(56) References Cited

U.S. PATENT DOCUMENTS

| | | | | |
|---|---|---|---|---|
| 3,959,635 | A | * | 5/1976 | Tanco ........................... 700/290 |
| 4,896,537 | A | | 1/1990 | Osborne |
| 4,934,192 | A | * | 6/1990 | Jenkins ........................... 73/660 |
| 5,046,318 | A | * | 9/1991 | Hwang et al. ................... 60/646 |
| 5,736,643 | A | * | 4/1998 | Bores et al. ...................... 73/660 |
| 7,654,145 | B2 | * | 2/2010 | Twerdochlib .................... 73/660 |
| 8,328,514 | B2 | | 12/2012 | Viripullan et al. |
| 2007/0258807 | A1 | * | 11/2007 | Brummel ....................... 415/118 |
| 2010/0076703 | A1 | | 3/2010 | Twerdochlib |
| 2011/0098948 | A1 | | 4/2011 | Platt et al. |
| 2013/0046507 | A1 | | 2/2013 | Vega Paez et al. |

* cited by examiner

Primary Examiner — Hoang Nguyen

(57) ABSTRACT

A blade vibration monitor backpressure limiting system (BVMBLS), that in addition to direct blade vibration and condenser backpressure monitoring utilizes other plural types of other parallel, real time monitored power plant operation state (OS) information that influences blade vibration. The system references previously stored information in an information storage device that associates respective types of monitored OS information with blade vibration. The BVMBLS determines in real time a likelihood of whether any of the monitored operation states, alone or in combination with other types of monitored operation states, is indicative of a turbine blade vibration safe operation (SO). The BVMBLS determination is utilized to increase or reduce power generation load incrementally so that power efficiency and maximum load is enhanced while turbine blade vibration is maintained in a safe operation state. The previously stored information is updated to new association information.

20 Claims, 5 Drawing Sheets

STEAM TURBINE BLADE VIBRATION MONITOR BACKPRESSURE LIMITING SYSTEM AND METHOD

BACKGROUND OF THE DISCLOSURE

1. Field of the Invention

The invention relates to steam power plant turbine blade vibration monitoring and control systems and methods. More particularly, the present invention is a blade vibration monitor backpressure limiting system (BVMBLS) that in addition to direct blade vibration and condenser backpressure monitoring utilizes other plural types of other parallel, real time monitored power plant operation state (OS) information that influence blade vibration. The BVMBLS references a base of stored knowledge that associates OS information with turbine blade vibration, and determines in real time a likelihood of whether any of the monitored OS, alone or in combination with other types of monitored OS, is indicative of a turbine blade vibration safe operation (SO) state. The BVMBLS determination is utilized to increase or reduce incrementally the monitored turbine's power generation load, so that power output and efficiency is enhanced while turbine blade vibration is in a safe operation (SO) state.

2. Description of the Prior Art

The last row of rotating blading in low pressure steam turbines contains the longest rotating blades in the turbine train. For this reason they are the most susceptible to aero elastic induced vibration. These last row blades are also subject to a vacuum back pressure on the downstream side, due to the condenser altering pressure characteristics as steam changes phase back to liquid. Generally, condenser backpressure increases with the condenser liquid phase temperature, and that temperature increases with power plant operational output load. For these reasons the backpressure critically influences the vibration characteristics of last row LP blading. If the backpressure is allowed to get too high the rotating blading can enter into a high vibration condition due to a variety of aero elastic events such as buffeting, stall flutter, and unstall flutter. The exact point of excessive blade vibration initiation cannot be predicted with certainty and can change rapidly, but its general probability can be forecasted within a band confidence within known backpressure/load operation states. The confidence of a safe operation state is determined by a combination of engineering calculations, monitored OS data, and historical data for the monitored turbine and other turbines.

Excessive blade vibration and its resulting high cycle fatigue of the LP blading can result in cracked blades. Routine inspections are typical and expensive repairs are required if cracked blading is discovered. If a crack propagates until the blade is liberated during operation, sometimes referred to as "throwing a blade", there is a significant chance that the thrown blade will cause damage to the LP turbine, possibly resulting in a rotor vibration induced failure of the whole turbine train, and damage to other plant equipment. Traditionally excessive operational turbine blade vibration has been avoided by conservative establishment of condenser backpressure thresholds. As backpressure approached a threshold limit power plant load was reduced, which also reduced power production capability and operating efficiency. If the backpressure exceeded the threshold the power plant control system would shut or reduce steam volume and/or pressure to the turbine, resulting in a "turbine trip" that essentially takes the turbine off line for further power generation until the backpressure event was remedied.

Traditional threshold limits on backpressure are calculated based on manufacturer and power plant operator operational experience and the design of the turbine, and are intended to minimize the chance of LP blade vibration and the resulting damage. These calculations are very conservative because the exact point of initiation of vibration is impossible to determine and the negative consequences of running a turbine excessive high vibration are great. At any given moment during power plant operation the operation safety (OS) margin based on any particular set of power plant operating conditions is not presently known. In addition to condenser gross backpressure operational monitoring steam turbines have been outfitted with a Blade Vibration Monitors (BVMs) for real time measurement of vibration. When the BVM determines that turbine blade vibration exceeded a defined threshold it caused the plant control system to trip the steam turbine. Typically BVM systems have been utilized in reaction to a prior blade cracking incident or for operational qualification of new turbine designs. The BVMs have also been used to verify that there is not excessive blade vibration during operation within recommended condenser backpressure limits.

Known blade vibration operational controls relying on rigid backpressure threshold rules, with or without supplementary BVM, are essentially "binary" in operation or alarming: for example, the turbine operational control system only alarms when the backpressure or BVM measured blade vibration exceeds first or default threshold settings, but trips the steam turbine when a second set of higher threshold settings is exceeded. The BVM and backpressure monitoring systems are essentially passive until the predefined thresholds are exceeded, and do nothing to optimize turbine power generation load. A rigid, threshold rule base detection system relying on a single digital adequate/excessive condenser backpressure or blade vibration input does not optimize power plant load and efficiency. Rather, backpressure detection alone, or with an actual BVM system only avoids operation state vibration triggering events that are sufficiently grave to warrant load reduction alarming or automatic steam turbine tripping.

Thus, a need exists in the art for a steam power plant turbine blade vibration monitoring and backpressure limiting system that can in real time monitor plural types of power plant operating state (OS) inputs, in addition to blade vibration and condenser backpressure, to evaluate whether the inputs separately or in combination are indicative of a safe operation (SO) condition by referencing stored information resources. If a SO state is determined, to then incrementally increase the plant power generation load to increase plant operation efficiency. This increase is subject to other limiting conditions to load, steam quality or other parameters in the power plant. Conversely, if a safe SO condition is not indicated, incrementally decrease the load to avoid an increased potential for turbine blade damage. In this manner power generation would be optimized through dynamic monitoring and control rather than relying on rigid binary blade vibration decision making that causes the power plant to operate at less than maximum or optimal potential power generation load and efficiency. Dynamic control also would reduce risk of power disruption attributable to turbine tripping.

SUMMARY OF THE INVENTION

Accordingly an object of the present invention is to optimize steam power plant power generation while maintaining turbine blade vibration safe operation conditions by dynamically monitoring plural operating states of the power plant, in addition to condenser back pressure and blade vibration, and determine in real time whether the monitored combination is indicative of a safe operation condition that may warrant incrementally increasing the monitored steam turbine load.

Another object of the present invention is to reference a base of stored knowledge that associates operation states with safe or insufficiently safe turbine blade vibration operation, and using those associations as part of the determination process.

An additional object of the present invention is to increment the base of stored knowledge with new safe operation state associations, as they are determined.

Yet another object of the present invention is to incrementally increase or decrease power plant load dynamically based on whether a respective determination is made that the turbine blade vibration is in a safe operation condition or insufficiently safe operation condition, respectively.

These and other objects are achieved in accordance with the present invention by a blade vibration monitor backpressure limiting system (BVMBLS) and associated method of operation that in addition to direct blade vibration and condenser backpressure monitoring utilizes plural types of other parallel, real time monitored power plant operation state (OS) information that influences blade vibration. The system references previously stored information in an automatic data storage device that associates the respective types of monitored OS information with blade vibration. The BVMBLS determines in real time whether any of the monitored operation states, alone or in combination with other types of monitored operation states, is indicative of safe operation with acceptable turbine blade vibration and establishes associated confidence levels that there is sufficient safe operation margin to compensate for operational variations. If a likelihood of blade damage exceeds a desired safe operation (SO) state confidence level, the BVMBLS causes the turbine incrementally to reduce power generation load (e.g., by alarming the plant control system for human control, or by automatically influencing the control system) until a SO state and confidence level are achieved. Conversely, if the monitored information is not indicative of excessive turbine blade vibration, that combination of monitored information is categorized as a safe operation (SO) state are added to a base of SO/confidence levels. If desired, based on that SO/confidence level determination, the plant control system or other control system that is coupled to the turbine may then incrementally increase power generation load. Thus the BVMBLS determination is utilized to increase or reduce power generation load dynamically in real time so that power efficiency is enhanced while turbine blade vibration is in a safe operation (SO) state with sufficient confidence level. The stored associations of monitored OS and blade vibration are updated to include new association information, preferably including both SO and not SO states/confidence levels. As noted, the monitoring and control functions to maintain a SO condition are preferably performed in real time. Dynamic incremental change in turbine output load avoids known passive blade vibration control methods that operate the steam turbine at less than optimal output load or risk turbine tripping if the output load results in exceeding defined SO thresholds.

An exemplary safe operation (SO) determination is made by referencing in real time previously stored information that associates respective types of operation states, or combinations of respective types of operation states, with turbine blade vibration, and ultimately establishing an overall turbine safe operation confidence level (CL) that does not exceed a pre-defined blade vibration operation threshold. If the overall safe turbine operation confidence level exceeds certain defined levels, then different actions can be implemented based on the confidence level. For example, a confidence level of only 1% might result in causing the plant control system to reduce power generation load. A confidence level of 40% might result in a warning or other alarm to the power plant control system and plant operation staff that future load reduction may be necessary. A confidence level exceeding 50% might result in an advisory communication to the plant operation staff that it may wish to consider increasing plant load. A higher confidence level of 80% might result in automatically incrementally increasing power generation load subject to grid power requirements or other limitations on power plant equipment.

New operation state (OS) combinations with high confidence levels of safe operation (SO) are added to the base of stored knowledge for future operation reference, and preferably so are combinations that do not indicate sufficiently high confidence levels. Over time the BVMBLS learns and accumulates a base of operation state information indicative of safe operation (SO) as well as information indicative of unacceptable operating conditions that might lead to turbine blade damage. In this manner power plant load can be dynamically monitored and managed in real time to optimize power plant performance without undue risk of turbine blade damage. The base of stored knowledge may include knowledge obtained from other power plants. Similarly updated stored knowledge from one power plant may be shared with other power plant sites for updating the latters' previously stored knowledge.

In some embodiments the system determines a likelihood of whether a monitored power plant operating state (OS), alone or in combination with other monitored OS information, is indicative of a safe operating (SO) condition or an unacceptable operating condition by performing the following tasks in any order. The system references previously stored information (from other sites and the site of the referenced system) in an information storage device that associates respective types of OS conditions with turbine blade vibration, and establishes first confidence levels. The system also compares combinations of stored sample readings and establishes second confidence levels. The system may establish multiple confidence levels based on the OS type and location, quantity of OS types available, and the use of different evaluation methods, and history data. The system also combines the plurality of first, second and if desired additional confidence level determinations to derive an overall confidence level of whether the turbine blade vibration is in a safe operation (SO) condition. This overall determination may be made using a variety of techniques, such as fuzzy logic, neural network evaluation, case-based reasoning, or other methodology. The confidence level information is used to vary power plant load.

More particularly, some embodiments of the present invention feature a method for monitoring and controlling power plant steam turbine blade vibration within a designated safe operation range, limiting backpressure on the blades by altering the turbine output load. The method is practiced by sampling in real time with sensors coupled to steam power plant equipment a plurality of types of operation states that impact steam turbine blade vibration, including among others steam turbine blade vibration amplitude and backpressure on the blades; and storing in a first automated data storage device at least one sampled data reading for each respective type of operation state. The method also determines in real time a likelihood of whether one or a combination of the respective at least one sampled operation state data readings is indicative of steam turbine blade vibration safe operation by: (i) referencing in a second automated data storage device previously stored information associating operation states with steam turbine blade vibration; (ii) comparing at least one stored operation state sample reading from each respective type of sampled operation state with respective stored association information relevant thereto and making respective turbine blade vibration safe operation first confidence level determinations; (iii) comparing a combination of the at least one stored sample reading from each respective type of sampled operation state with respective stored association information relevant thereto, if such combination information is available, and making respective turbine blade vibration safe operation second confidence level determinations; (iv) and if desired, continuation of this process for third or more confidence level determinations. All desired confidence levels information are combined to derive a turbine blade vibration safe operation overall confidence level. The method is further practiced by causing the steam turbine to lower turbine load incrementally when any of the sequentially determined first, second, additional or overall confidence levels is below a desired margin of safe operation; and by causing the steam turbine to increase turbine load incrementally when the overall confidence level is indicative of turbine blade vibration safe operation.

Some embodiments of the present invention feature a system for monitoring and controlling power plant steam turbine blade vibration within a designated safe operation range, limiting backpressure on the blades by altering the turbine output load, comprising: a plurality of types of sensors coupled to steam power plant equipment for respectively sampling in real time a plurality of types of operation states that impact steam turbine blade vibration, including among others steam turbine blade vibration amplitude and backpressure on the blades. The invention embodiment also includes a blade vibration monitoring backpressure limiting system (BVMBLS) in communication with the plurality of types of sensors. The BVMBLS includes a processor in communication with a first automated data storage device, and a second automated data storage device having therein previously stored information associating operation states with steam turbine blade vibration. The processor is capable of executing instructions stored in an accessible memory device. When executing the instructions the BVMBLS processor: (I) sampling in real time the plurality of types of sensors; (II) storing in the first automated data storage device at least one sampled data reading for each respective type of operation state; and (III) determining in real time a likelihood of whether one or a combination of the respective at least one sampled operation state data readings is indicative of steam turbine blade vibration safe operation. The processor determines in (III) the likelihood in real time by: (a) referencing in the second automated data storage device the previously stored information associating operation states with steam turbine blade vibration; (b) comparing at least one stored operation state sample reading from each respective type of sampled operation state with respective stored association information relevant thereto and making respective turbine blade vibration safe operation first confidence level determinations; (c) comparing a combination of the at least one stored sample reading from each respective type of sampled operation state with respective stored association information relevant thereto, if such combination information is available, and making respective turbine blade vibration safe operation second, and if desired additional confidence level determinations; and (d) combining all desired confidence levels information to derive a turbine blade vibration safe operation overall confidence level. A steam turbine control system is coupled to the steam turbine for causing the steam turbine to vary output load, and is also coupled to the BVMBLS. The steam turbine control system causes the steam turbine to lower turbine load incrementally when any of the BVMBLS sequentially determined first, second, additional or overall confidence levels is below a desired margin of safe operation. Similarly, the steam turbine control system causes the steam turbine to increase turbine load incrementally when the BVMBLS overall confidence level determination is indicative of turbine blade vibration safe operation.

Other embodiments of the present invention feature a system for monitoring and controlling power plant steam turbine blade vibration within a designated safe operation range, limiting backpressure on the blades by altering the turbine output load, comprising a plurality of types of sensors coupled to steam power plant equipment for respectively sampling in real time a plurality of types of operation states that impact steam turbine blade vibration, including among others steam turbine blade vibration amplitude and backpressure on the blades; a blade vibration monitoring backpressure limiting system (BVMBLS) in communication with the plurality of types of sensors, a first automated data storage device, and a second automated data storage device having therein previously stored information associating operation states with steam turbine blade vibration; and a steam turbine control system that is coupled to the steam turbine for causing the steam turbine to vary output load, and that is coupled to the BVMBLS. The BVMBLS includes means for sampling in real time the plurality of types of sensors; means for storing in the first automated data storage device at least one sampled data reading for each respective type of operation state; and means for determining in real time a likelihood of whether one or a combination of the respective at least one sampled operation state data readings is indicative of steam turbine blade vibration safe operation. The means for determining includes means for referencing in the second automated data storage device the previously stored information associating operation states with steam turbine blade vibration; means for comparing at least one stored operation state sample reading from each respective type of sampled operation state with respective stored association information relevant thereto and making respective turbine blade vibration safe operation first confidence level determinations; means for comparing a combination of the at least one stored sample reading from each respective type of sampled operation state with respective stored association information relevant thereto, if such combination information is available, and making respective second or greater number (N) of turbine blade vibration safe operation confidence level determinations; and means for combining all desired confidence levels information to derive a turbine blade vibration safe operation overall confidence level. The BVMBLS may incorporate a processor that executes software instructions for performing some or all of these recited means. The steam turbine control systems causes the steam turbine to lower turbine load incrementally when any of the BVMBLS sequentially determined first, second, . . . , N or overall confidence levels is below a desired margin of safe operation and conversely increase turbine load incrementally when the BVMBLS overall confidence level determination is indicative of turbine blade vibration safe operation.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a blade vibration monitoring backpressure limiting system (BVMBLS) that monitors plural plant operating states (OS), in addition to blade vibration and condenser backpressure, in real time and stores the monitored OS data in an automated storage device. The system determines a likelihood of whether a monitored OS, alone or in combination with other monitored OS information, is indicative of a turbine blade vibration safe operating (SO) condition by performing the following tasks in any order. The system references previously stored information in an information storage device that associates respective types of monitored OS information with blade vibration. The BVMBLS determines in real time a likelihood of whether any of the monitored operation states, alone or in combination with other types of monitored operation states, is indicative of excessive turbine blade vibration, which if not remedied may lead to turbine damage. If likelihood of blade damage exceeds a desired safe operation (SO) state the plant control system incrementally reduces power generation load until blade vibration is reduced to a SO state. Conversely if the monitored information is not indicative of excessive turbine blade vibration, that combination of monitored information is categorized as a safe operation (SO) state and added to a base of SO confidence levels. If desired, based on that SO state determination, the plant control system may then incrementally increase power generation load. Thus the BVMBLS determination is utilized to increase or reduce power generation load dynamically in real time so that power efficiency is enhanced while turbine blade vibration is in a safe operating (SO) state.

The stored associations of monitored OS and blade vibration are updated to include new association information. As noted, the monitoring and control functions to maintain an SO condition are preferably performed in real time. The BVMBLS can update the knowledge base of stored information and thus become "self-learning" to improve its confidence level determinations. Human input from the power plant and other personnel may be included in this or any other update. The system includes the ability for human operators to input information about accuracy of the system's outputted confidences, as well as their experiential and judgmental knowledge. The base of stored information updates can be shared with other BVMBLS in other power plants and/or in a central monitoring station that is responsible for multiple power plants. Steam power plant operators, their equipment manufacturers and equipment service providers can share the base of stored information and cooperate to update it to include new confidence level determinations.

BVMBLS Hardware Description

Figure 1:
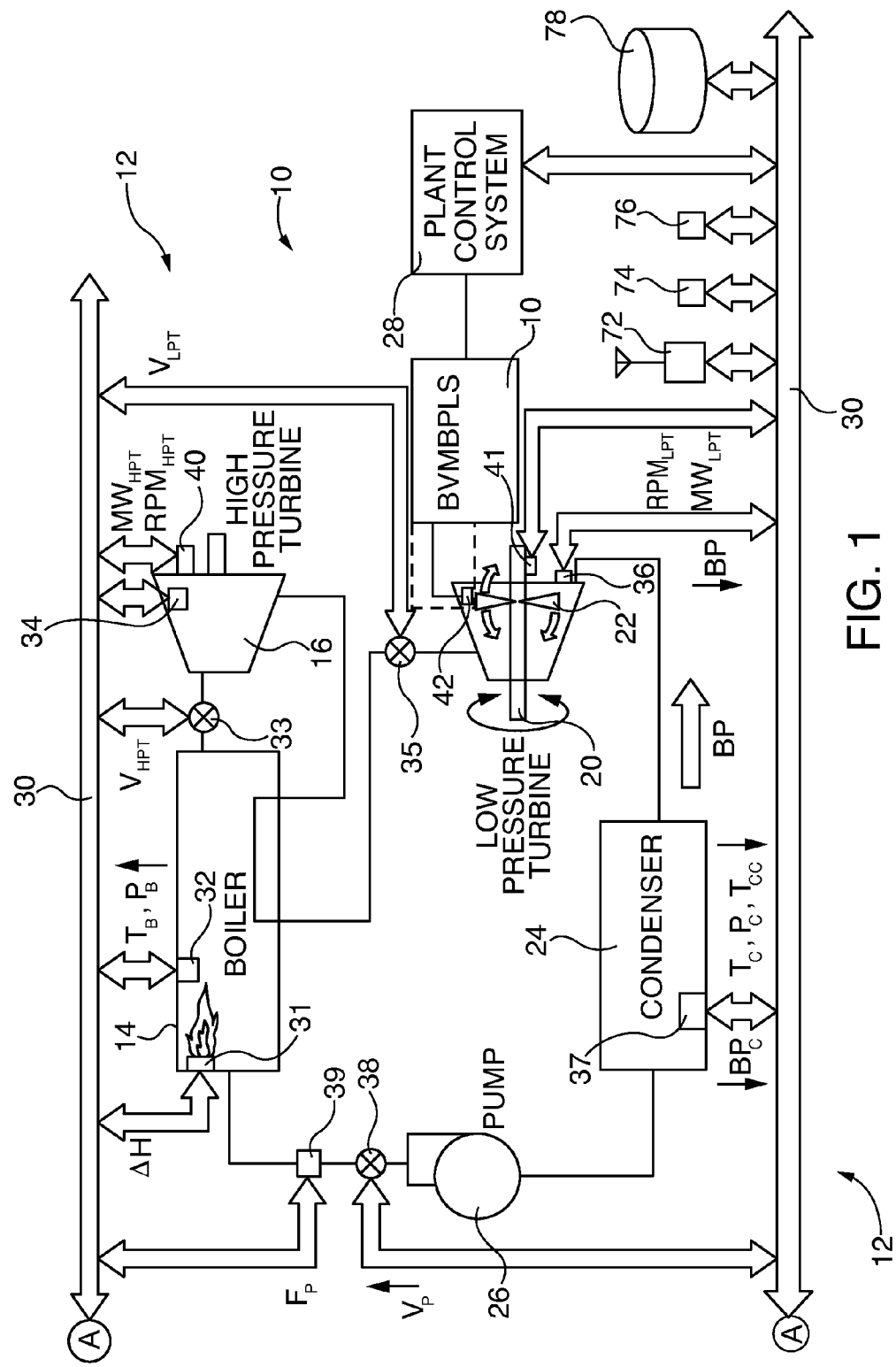
FIG. 1 is a schematic diagram of an embodiment of a steam power plant including a blade vibration monitor backpressure limiting system (BVMBLS) of the present invention.
Figure 2:
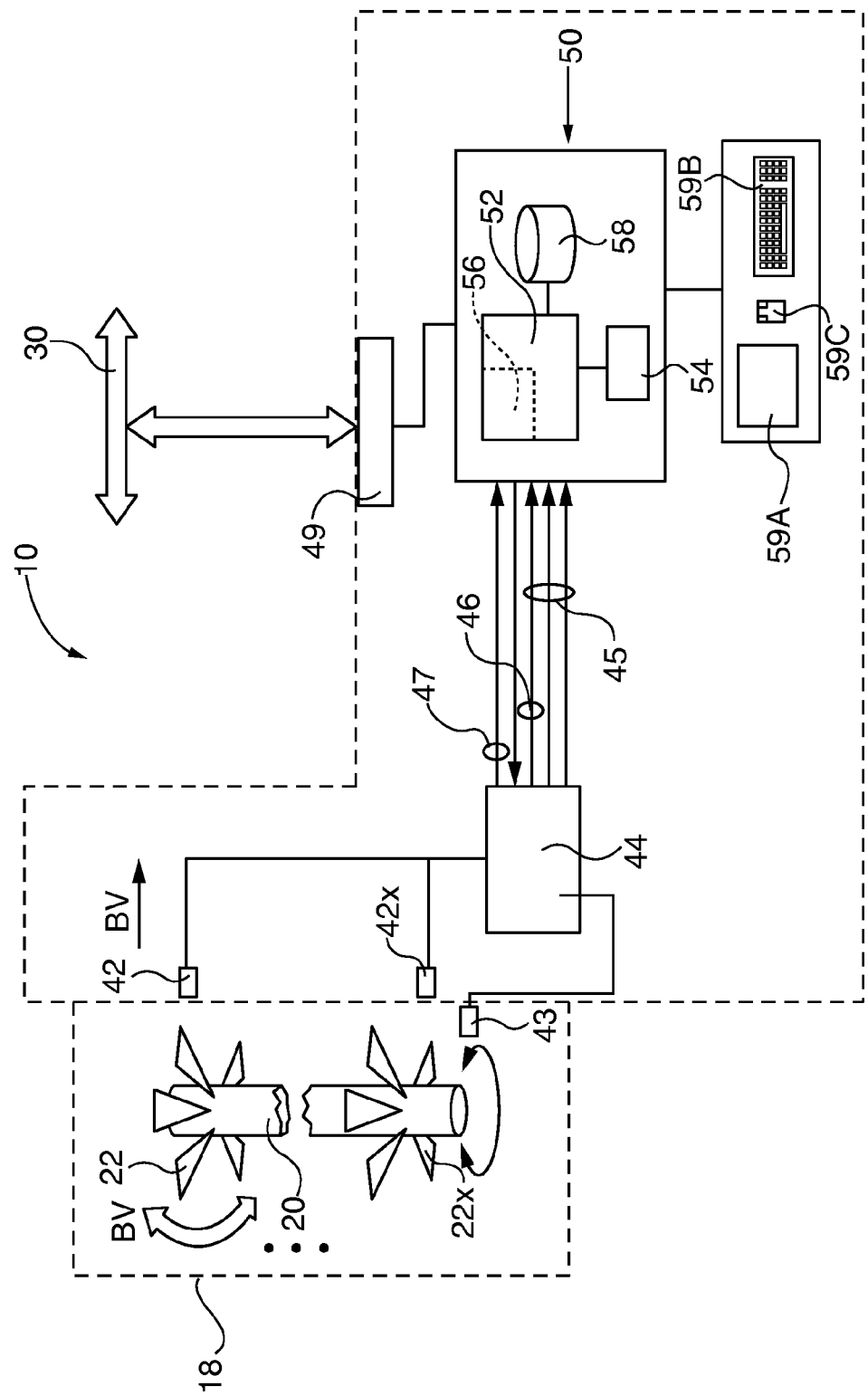
FIG. 2 is a block diagram of an embodiment of the BVMBLS of FIG. 1.

An embodiment of the system of the present invention is shown in FIG. 1. The BVMBLS 10 monitors steam power plant 12, including a boiler 12, one or more high pressure steam turbines 16 and one or more low pressure steam turbines 18. The low pressure turbine 18 has a rotating turbine shaft 20 and turbine blades 22 for providing mechanical power to a generator (not shown). The turbine blades 22, especially the last row of longest blades 22, which are immediately upstream the condenser 24, are susceptible to vibration, as depicted by the arrows V. In the condenser 24 steam changes phase to liquid, which maintains a low backpressure, depicted by the arrow BP, that exist at the exit of the low pressure turbine 18. The condensed water is pumped by one or more pumps 26 for return to the boiler 14, completing the steam cycle. Operation states (OS) of the aforementioned power plant equipment is monitored and controlled by the plant control system 28 under a combination of automated and operator controlled functions. The plant control system 28 is communicatively coupled to sensors, transducers and actuators associated with the aforementioned power plant equipment by known industrial automation communication pathways. For simplicity an exemplary communication pathway is shown as a single data bus 30. Exemplary plant control system 28 and plant equipment interface devices that detect and/or alter plant equipment operating states (OS) include:

boiler heater 31 and associated fuel flow control systems ($\Delta T$), boiler temperature and pressure sensors 32 ($T_B$, $P_B$) and reheat steam flow, high pressure turbine steam flow or throttle control valve position 33 and sensors 34, low pressure turbine flow or throttle control valve position 35 and sensors 36 (including one or more back pressure (BP) and/or vibration (BV) sensors, turbine casing temperature, steam inlet temperature and pressure, $RPM_{LPT}$), condenser sensors 37 ($BP_C$, $T_C$, $P_C$), condenser coolant temperature ($T_{CC}$) and/or condenser maintenance diagnostic reminders, pump flow control valve 38, pump flow sensor ($F_P$)

high pressure turbine load sensor 40 ($MW_{HPT}$), and low pressure turbine load sensor 41 ($MW_{LPT}$).

The plant control system 28 monitors and controls the aforementioned operating states as well as others. Some OS have direct or indirect impact on turbine blade vibration, especially backpressure BP.

The BVMBLS 10 includes a blade vibration transducer 42, and such as a known magnetic vibration transducer and a shaft phasor position detector 43 that collectively detect each blade arrival at the magnetic sensor and label each blade in a given row by rotary position using shaft phasor position detector 43 and transmits each passing blade's information through a communications pathway such as an RG-58 type coaxial cable to a fiber optic communications module (FOCM) 44. Other known communications pathways may be substituted for the ones described in this exemplary embodiment. If multiple blade rows are monitored, a multi-channel system may be utilized to transmit multiple blade rows vibration information. The FOCM 44 sets a time stamp to the arrival of each blade based on the response of the magnetic sensor to the passage of the blade tip, attaches a row tag specific to each monitored row, and sends these time stamps with row specific tag to the BVM processor through a single fiber optic cable. The BVM constructs a vibration wave for each blade typically from 33 revolutions of the shaft. A Fourier Transform of each blade vibration wave produces a blade vibration spectrum for each blade, from which blade vibration modes are identified and blade mode amplitudes are derived. Bidirectional communications between the BVMBLS 10 and the remainder of the power plant 12, including the plant control system 28 is facilitated by communications module 49, including through the data bus 30 pathways. Other direct and indirect communications between the BVMBLS 10 and the remainder of the power plant 12, including the plant control system 28 may be provided.

The BVMBLS 10 includes a controller 50 that has a processor 52, memory 54 coupled to the processor and software modules 56 that when executed by the processor causes the system to monitor plant operating conditions, including the respective blade vibration waveforms detected by the vibration transducer(s) 42, condenser backpressure BP impacting turbine blade vibration, turbine load $MW_{LPT}$, etc., and determine the likelihood of whether the monitored OSs, alone or in combination, are indicative of a low pressure turbine 18 safe operating (SO) condition, using the steps subsequently described herein. The controller 50 may be incorporated in the plant control system 28 or as a stand-alone dedicated hardware platform, such as a known programmable logic controller or a personal computer utilizing a known operating system. The controller 50 and its processor 52 have access to a data storage device 58, which may include a disc drive, non-volatile solid state memory, firmware or the like. The storage device 58 may be incorporated into the controller 50 or be coupled to and remotely accessible to the controller. Data storage device 58 includes previously stored information that associates respective types of power plant detected operation conditions with blade vibration. More particularly the stored information is useful for determining whether the present operating conditions contribute to safe operation (i.e., blade vibration within acceptable operation specification) or whether turbine load $MW_{LPT}$ must be reduced to bring blade vibration within acceptable operational specification. The stored information may include by way of non-limiting example rules, set points, absolute reading limits, historical information, weightings and statistical probabilities. A human machine interface (HMI) 59 is coupled to the controller 50, and may include a visual display or monitor 59A, a keyboard 59B, a mouse 59C or other known HMI devices. The HMI may be used to configure or monitor the BVMBLS 10, modify the stored information in the system data storage device 58, and allow human operator interaction and control over the system.

In response to an observed operating condition indicating excessive turbine blade 22 vibrations outside a safe operation specification the BVMBLS 10 directly or indirectly through the plant control system 28 may automatically operate or enunciate for human operation output devices. For example the BVMBLS 10 may cause regulation of the low pressure turbine steam control valve 35 to reduce steam flow to the low pressure turbine 18, or if necessary trip the steam turbine to an off-line condition. The controller 50 is respectively in communication with the various plant system detection and control devices 31-41 by respective communications pathways, which may include by way of non-limiting example wireless signal, known metallic cable including twisted pair wiring, co-axial, multiple conductor wire cable, optical cable and data busses employing known communications protocols. Additionally the controller 50 may be in communication with other devices within or remote from the power plant 12, including by way of non-limiting example wireless receiver/transmitters 72, other facility command and control systems 74 remote monitoring stations 76 and remote data storage/web hosting/data access sites 78.

To facilitate a clear understanding of the present invention, illustrative examples have been provided herein which described certain aspects of the invention system hardware and architecture. However, it is to be appreciated that these illustrations are not meant to limit the scope of the invention, and are provided herein to illustrate certain concepts associated with the invention. It is also to be understood that the present invention may be implemented in various forms of hardware, software, firmware, special purpose processors, or a combination thereof.

BVMBLS Operation

As previously noted the system 10 monitors operation states (OS) of power plant 12 equipment in real time and stores OS samples. The system 10 determines a likelihood of whether a monitored OS reading, alone or in combination with other readings, is indicative of a turbine 18 blade 22 vibration safe operation (SO) condition with sufficient safety margin for statistical variations. As a general overview, the system 10 performs the following tasks in any order. The system references previously stored information in an information storage device that associates respective types of OS readings with turbine blade vibration, and establishes first safe operation (SO) determination confidence levels (CL). The system also compares a combination of OS sample readings and establishes a second SO confidence level, and potentially additional SO confidence levels. The system also combines all desired confidence levels information to derive an overall confidence level of whether the turbine blade vibration is within a safe operating condition. An enunciation, alarm or automated reaction response is initiated if the overall confidence level does not indicate a likelihood of safe operation, depending upon the severity of the monitored situation. For example, a vibration determination above a defined threshold may cause automatic turbine tripping, whereas a vibration determination above a lower defined threshold may initiate a lower level of urgency response depending upon the overall confidence level.

Preferably, the present invention is implemented in software as a program or plural program modules tangibly embodied on a program storage device. The program may be uploaded to, and executed by, a machine comprising any suitable architecture. As previously described herein, preferably the controller 50 is implemented on a computer platform having hardware such as one or more central processing units (CPU), a random access memory (RAM), and input/output (I/O) interface(s). The computer platform also includes an operating system and microprocessor instruction code. Both the various processes and functions described herein may be part of the microprocessor instruction code or part of the program (or combination thereof), which is executed via the operating system. In addition, various other peripheral devices may be connected to the computer platform such as an additional data storage device 58, 78 and a various output devices.

Figures 3, 3A:
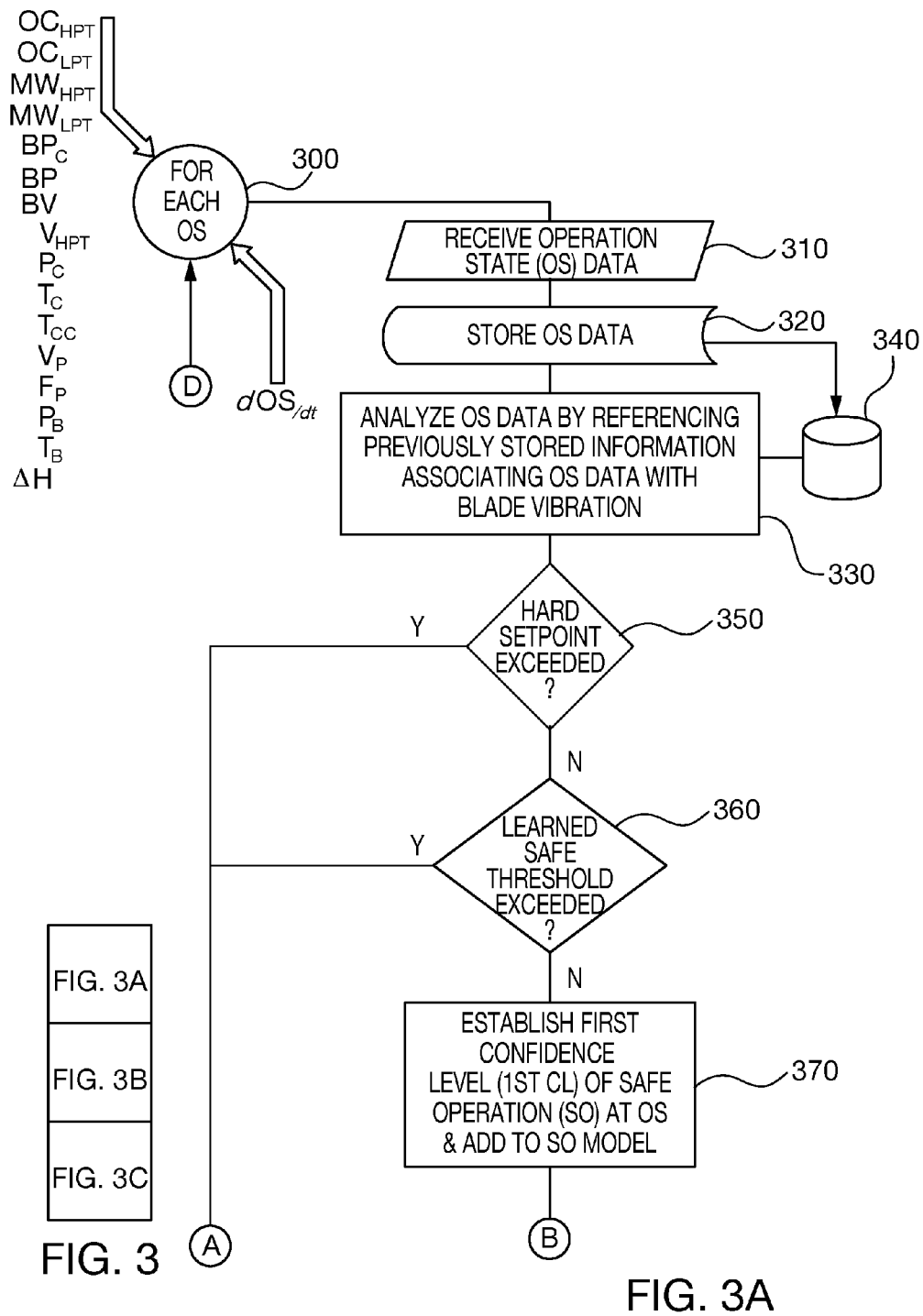
FIGS. 3A-3C is a flowchart schematic diagram of an embodiment of a method for operating a BVMBLS in a steam power plant using the system of FIGS. 1 and 2.

FIG. 3 is a flowchart of controller 50 operation of its software module 56 instruction sets. Steps 300-370 are optionally performed for each individual type of monitored OS, which may be chosen as a subset of all monitored OS. Assuming that it is desired to monitor each individual type of previously described OS: $T_B$, $P_B$, $V_{HPT}$, high pressure and low pressure turbine OS's, BV, BP, $P_C$, $T_C$, $T_{CC}$, $RPM_{HPT}$, $RPM_{LPT}$, $BP_C$, $V_P$, $F_P$, $\Delta H$, as well as the rates of change of each (dOS/dt), etc., when practicing the present invention then Steps 330-370 are performed. If there is a plurality of any type of OS, then all the steps 300-370 are performed for all of them that are desired to be monitored. The steps 300-370 may be performed in parallel or sequentially for each OS, or in any combination or sub-combination desired for a monitoring function. Alternatively, if it is desired to practice the present invention by analyzing only combinations of types of OS's, steps 310 and 320 are practiced and then steps 330-370 are skipped. For the sake of brevity operation and monitoring of an individual OS—condenser backpressure $BP_C$ monitored in condenser sensor 37—will be described in greater detail, it being understood that the monitoring steps and concepts will be similar for other types of OS's and related sensors.

In step 300 the condenser backpressure $BP_C$ portion of condenser sensor 37 is selected for further monitoring steps by the BVMBLS 10. Condenser backpressure operating state (OS) data are received by the controller 50 at step 310 and stored in step 320. In step 330 the controller 50 references in the data storage device 340 previously stored information about condenser backpressure data sample readings and their associations with blade vibration (BV) of turbine blades 22. The stored information may include by way of non-limiting example rules, set points, absolute reading limits, historical information (including human experiential and judgmental historical information) or other input concerning, for example, condenser back pressure sensor accuracy or accuracy of predictions made by the system 10, weightings and statistical probabilities for excessive blade vibration for this specific low pressure turbine 18 installation or other low pressure turbines in the same or different geographically located power plants. The data storage device 340 may be incorporated in either or both of the data storage devices 58, 78 in the embodiment of FIG. 1 or any other type of known storage device.

In step 350 the system 10 determines whether condenser backpressure OS reading exceeds a "hard" set point or absolute pressure ceiling reading that is indicative excessive blade vibration. If the actual reading exceeds the hard set point ceiling the system 10 will enunciate a "not safe" operating state (OS) at step 460, which will cause the plant control system 28 to reduce low pressure turbine 18 load $MW_{LPT}$ incrementally. Depending upon the severity of the backpressure reading exceeding the hard set point ceiling the system 10 may cause the plant control system 28 to trip the turbine 18. If the actual condenser backpressure reading $BP_C$, does not exceed the hard set point the system 10 will determine whether the actual reading is indicative of a previously learned state excessive condenser backpressure threshold, which is accessed in the stored information data storage device 340 and enunciate an unsafe OS at step 460. If not, the system next makes a first confidence level ($1^{st}$ CL) determination of the likelihood that the condenser backpressure OS sample reading stored in step 320 is indicative of a safe operation (SO) condition with sufficient safety margin for statistical variations, based on stored information in the data storage device 340. The newly established $1^{st}$ CL is added to the SO model and stored in the base of stored knowledge in data storage device 340, for future operation reference.

Confidence level determination is performed by the system 10 without human intervention using any one or more of fuzzy logic, self-learning, and algorithmic, statistical or heuristic methods in the controller 50. For example, based on self-learning the system 10 may associate a given combination of condenser backpressure readings or rates of their change over time with a previously experienced safe operation (SO) condition in a particular monitored low pressure turbine 18, yet at a later time may enunciate a not SO condition if the operating condition exceeds a defined number of minutes. In another example, by employing a known fuzzy logic program module in the controller 50, the system may weigh a combination of readings in plural types of monitored OSs as indicative of an impending not SO turbine operation or inadequate safety margin for statistical variation condition; though no individual reading alone is considered indicative of a not SO condition.

After the first confidence level is established in step 370, combinations of different types of OS data sample readings and/or OS data sample readings taken at different times are analyzed at step 390 by referencing previously stored information in data storage device 400 that associates combinations of sample readings with SO or not SO conditions. The previously stored information in data storage device 400 is of the same types and sources that were generally described with respect to storage device 340. The function of data storage device 400 may be incorporated within data storage devices 58 or 78 or any other type of storage device. The stored information in storage device 400 may include by way of non-limiting example rules, set points, absolute reading limits, historical information, weightings or statistical probabilities for SO or not SO blade vibrations for this specific low pressure turbine 18 or other similar turbines in the same or different geographically located power plants, other types of monitored OS's, as well as human-inputted information.

In step 420, the system 10 determines whether a previously stored (i.e., in the base of stored knowledge in storage device 400) learned state threshold relating to a combination of types of OS data readings has been exceeded, and if so enunciates an alarm condition at step 460. For example, if a sampled condenser 24 backpressure ($BP_C$) gradient exceeds a certain value within five minutes in combination with an OS reading for a low pressure turbine load ($MW_{LPT}$) exceeding a defined value.

Figure 3B:
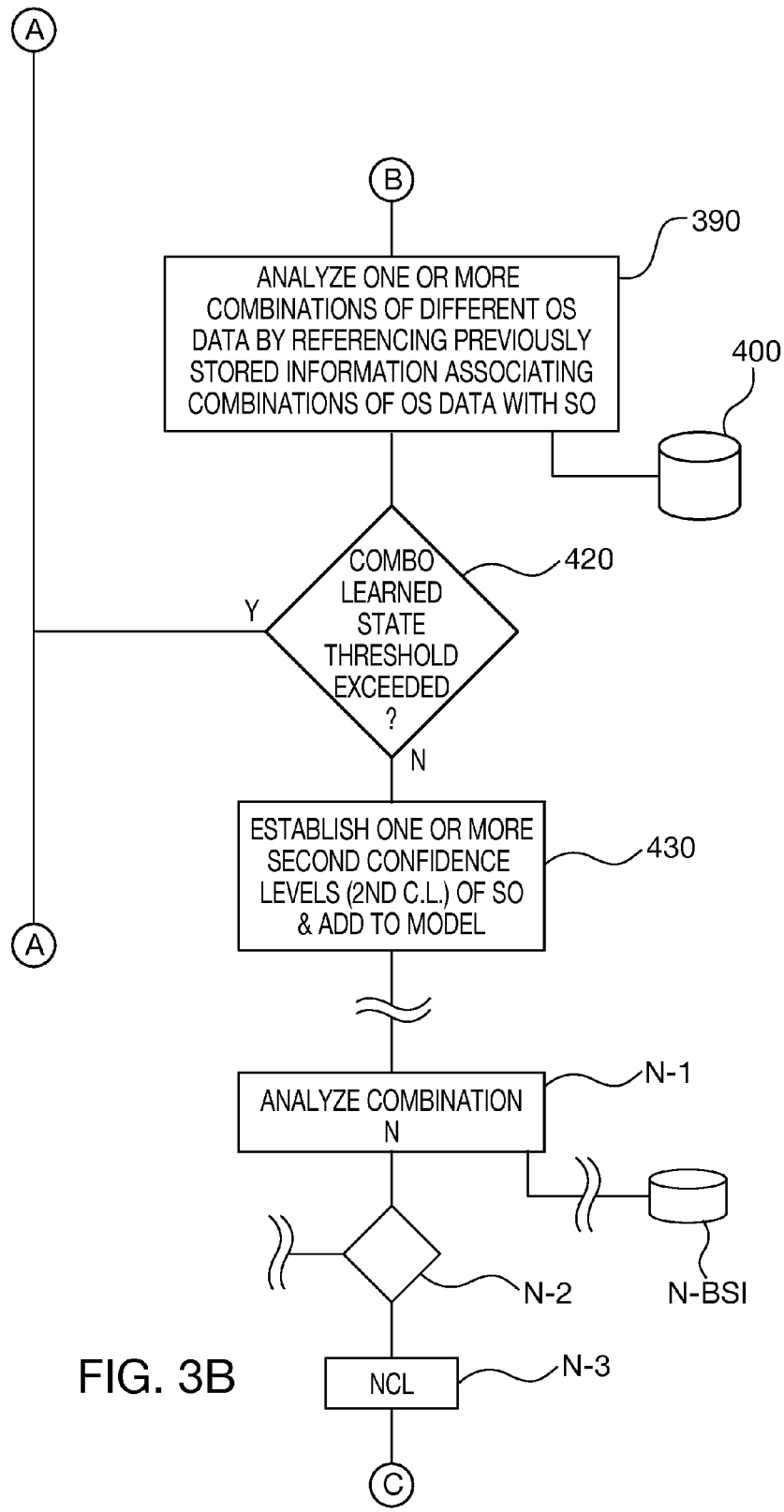
Figure 3C:
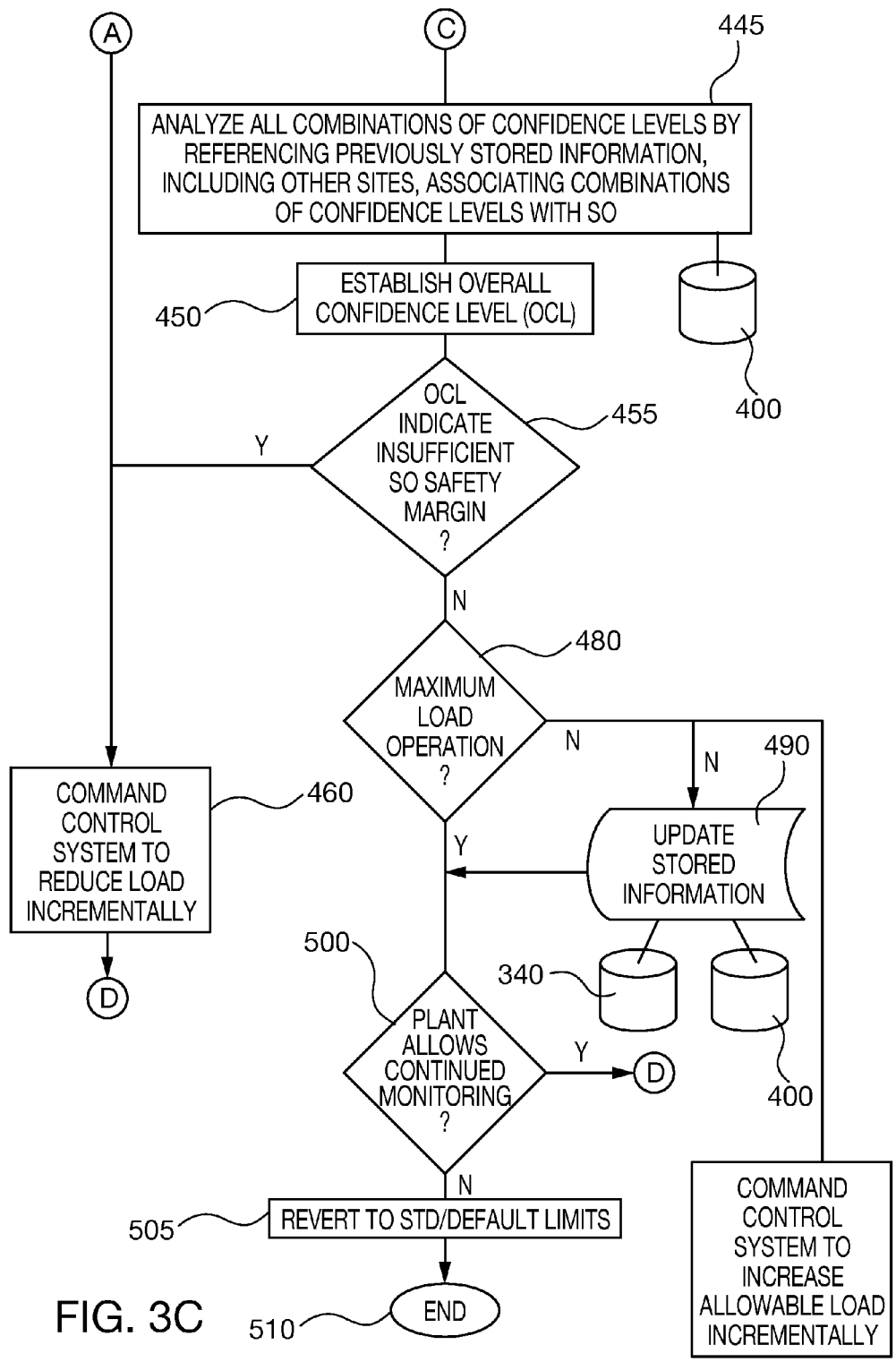

If no combination learned state analysis in step 420 identifies an exceeded threshold, the system 10 evaluates one or more OS combination readings and next makes a second confidence level ($2^{nd}$ CL) determination of the likelihood that a combination of sample OS data readings stored in respective steps 320 is indicative of a SO condition based on stored information in the data storage device 400. If the $2^{nd}$ CL determination indicates a SO with sufficient safety margin for statistical operational variations it is added to the stored SO learned state model in the base of stored information 400. This sequence of steps in determining the $2^{nd}$ CL optionally may be iterated multiple times resulting in any number of confidence level determinations ($N^{th}$ CL). For simplicity of the diagram, the flow chart additional optional iterative confidence level determinations are shown collectively in FIG. 3B as steps N-1 through N-3, with base of stored information N-BSI.

The system 10 analyzes combinations of all desired confidence levels ($1^{st}$, $2^{nd}$ and any subsequent CLs) in step 445 by referencing previously stored information in the base of stored knowledge 400 that associates combinations of confidence levels with SO conditions. The base of stored knowledge includes the types of information previously described, including probabilities or likelihoods of SO or not SO. At step 450 the system 10 determines an overall confidence level (OCL) based on the analysis of all desired confidence levels. If the OCL determined at step 450 is indicative of an insufficient SO safety margin for statistical operational variations an alarm condition will be enunciated at step 455, as was done previously at steps 350 and 360.

If at any time a decision is made to enunciate an alarm condition, the designated alarm function is performed at step 460, and may include outputting not safe OS status information to other systems, such as the plant control system 28, another facility control center 74 or a remote monitoring station 76.

If at step 455 the overall confidence level (OCL) indicates that there is a SO condition with sufficient safety margin a decision is made at step 480 whether the low pressure turbine 18 is operating at maximum load $MW_{LPT}$. If maximum load is not met the base of stored knowledge regarding the present SO conditions is added to the SO learned state model to update the stored information base with information gathered during prior monitoring cycles. Updated information is stored in the data storage devices 340, 400 (or any other storage device) in step 490. Thereafter the BVMBLS 10 seeks instructions from the plant control system 28 or other plant monitoring and control sites whether to continue monitoring at step 500. If yes the monitoring cycle resumes at step 300. If there will be no further monitoring by the BVMBLS 10 the plant 12 operation reverts to the standard or default settings for blade vibration and condenser backpressure at step 505, which generally will cause low pressure turbine 18 to generate a lower power load $MW_{LPT}$ than the more optimal load capability facilitated during operation of the system 10. The BVMBLS 10 then ends its monitoring function at step 510, until it is reactivated.

In the present invention a blade vibration monitor (BVM), as incorporated in this BVMBLS 10, expands the "allowable" backpressure safe operation (SO) zone for the low pressure steam turbine 18, and thus facilitates a higher power generation output within acceptable operation safety (OS) margins. The BVMBLS 10 continuously measures the vibration level of preferably all LP blades 22, performs a diagnostic evaluation of OS operating parameters, and feeds revised, newly learned SO states operating limits back into the plant control system 28 to allow higher turbine output loads than preset or default allowable vibration/back pressure/power output conditions. Newly learned SO states are stored in the base of stored knowledge for future operational reference by the BVMBLS 10.

As the point at which unacceptable transient LP blade 22 vibration (BV) will occur is difficult to predict, the base of stored knowledge and advanced data analysis diagnostic tools of the BVMBLS allow the system to evaluate historical operating conditions of the specific monitored turbine 18, as well as similar onsite/remote site turbines, and correlate the historical SO data to presently-measured blade vibration. In this way the system can predict that a certain amount of SO margin should exist for the current operating conditions and can allow the backpressure to increase while still having an acceptable margin of safety. The BVMBL then feeds that "revised SO limit" information back into the plant control system 28 or other control system that actually operates the power plant. The control system will utilize that "revised SO limit" in a way determined by the BVMBL recommended control specification, and customer's imposed limitations.

The base of stored knowledge in any one or more of the exemplary storage devices 58, 78, 340 or 400 (or of any additional storage device or of one that consolidates various bases of stored knowledge or other types of information) allows the BVMBL 10 to observe previous OS's under which blade 22 vibration was initiated, and previous OS's when blade vibration was not initiated. As previously noted the BVMBLS 10 analysis of these data may include a variety of techniques, such as statistical analysis, first principle "rule based" analysis, neural net, or any other method of evaluating the data in order to draw conclusions as to the proper backpressure (BP) limit for the BVMBLS 10 to output. In this manner, the BVMBLS 10 is a self-learning system that can adapt itself to many different conditions and different power plants.

By incorporating the blade vibration and backpressure limiting system of the present invention in a steam power plant it is possible to accomplish one or more of the following results:

1) Measure the actual vibration of the last row of LP blading;
2) Integrate this measured vibration into a database containing the history of vibration and turbine OS operating parameters for this specific turbine as well as a fleet of similar turbines;
3) Perform an automated real time analysis of that data, which may include self-learning techniques;
4) Use the results of the analysis of the data in the database to predict in real time the amount of backpressure margin for safe operation (SO) of the monitored turbine and/or
5) Integrate that new analysis information back into the turbine control system as a revised backpressure limit and alter the turbine operational control logic.

Thus in using the present system and its method of operation as set forth herein, it is possible to operate the turbine safely at higher backpressure than operation control systems based on rigid, conservative default backpressure limits, allow increased loading of the turbine, and a reduction in the occurrences of backpressure related turbine trips.

Although various embodiments, which incorporate the teachings of the present invention, have been shown and described in detail herein, those skilled in the art can readily devise many other varied embodiments that still incorporate these teachings. It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a larger network system, such as a corporate network, metropolitan network or a global network, such as the Internet.

What is claimed is:

1. A method for monitoring and controlling power plant steam turbine blade vibration within a designated safe operation range, limiting backpressure on the blades by altering the turbine output load, comprising:

sampling in real time with sensors coupled to steam power plant equipment a plurality of types of operation states that impact steam turbine blade vibration, including among others steam turbine blade vibration amplitude and backpressure on the blades;

storing in a first automated data storage device at least one sampled data reading for each respective type of operation state;

determining in real time a likelihood of whether one or a combination of the respective at least one sampled operation state data readings is indicative of steam turbine blade vibration safe operation by:

referencing in a second automated data storage device previously stored information associating operation states with steam turbine blade vibration; comparing at least one stored operation state sample reading from each respective type of sampled operation state with respective stored association information relevant thereto and making respective turbine blade vibration safe operation first confidence level determinations;

comparing a combination of the at least one stored sample reading from each respective type of sampled operation state with respective stored association information relevant thereto, if such combination information is available, and making respective turbine blade vibration safe operation second confidence level determinations; and combining all prior sequentially determined confidence levels information to derive a turbine blade vibration safe operation overall confidence level;

causing the steam turbine to lower turbine load incrementally when any of the sequentially determined first through overall confidence levels is below a desired margin of safe operation; and causing the steam turbine to increase turbine load incrementally when the overall confidence level is indicative of turbine blade vibration safe operation.

2. Performing the method of claim 1 in a feedback loop; and reverting to a safe operation range default mode after cessation of the feedback loop performance.

3. The method of claim 2, further comprising updating previously stored information in the second automated data storage device with additional information derived from performing any of the previous steps.

4. The method of claim 2, further comprising causing a power plant control system to lower or increase steam turbine load.

5. The method of claim 2, further comprising performing one or more additional confidence level determinations after the second confidence level determinations.

6. The method of claim 2, wherein the determining step is performed using any one of fuzzy logic, self-learning, algorithmic, statistical, neural network logic, case-based reasoning or heuristic methods.

7. The method of claim 1, further comprising updating previously stored information in the second automated data storage device with additional information derived from performing any of the previous steps.

8. The method of claim 1, further comprising storing any of the stored operation state data sample readings or the previously stored information that associates respective type of operation state data sample readings with turbine blade vibration in any other accessible automated data storage device.

9. The method of claim 1, wherein the previously stored information comprises any one of rules, set points, absolute reading limits, historical information, weightings, human inputs or statistical probabilities.

10. The method of claim 1, wherein the determining step is performed using any one of fuzzy logic, self-learning, algorithmic, statistical, neural network logic, case-based reasoning or heuristic methods.

11. A system for monitoring and controlling power plant steam turbine blade vibration within a designated safe operation range, limiting backpressure on the blades by altering the turbine output load, comprising:

a plurality of types of sensors coupled to steam power plant equipment for respectively sampling in real time a plurality of types of operation states that impact steam turbine blade vibration, including among others steam turbine blade vibration amplitude and backpressure on the blades;

a blade vibration monitoring backpressure limiting system (BVMBLS) in communication with the plurality of types of sensors, the BVMBLS including a processor in communication with a first automated data storage device, and a second automated data storage device having therein previously stored information associating operation states with steam turbine blade vibration, the processor capable of executing instructions stored in an accessible memory device, that when executing said instructions the BVMBLS processor:

sampling in real time the plurality of types of sensors;

storing in the first automated data storage device at least one sampled data reading for each respective type of operation state;

determining in real time a likelihood of whether one or a combination of the respective at least one sampled operation state data readings is indicative of steam turbine blade vibration safe operation by:

referencing in the second automated data storage device the previously stored information associating operation states with steam turbine blade vibration;

comparing at least one stored operation state sample reading from each respective type of sampled operation state with respective stored association information relevant thereto and making respective turbine blade vibration safe operation first confidence level determinations;

comparing a combination of the at least one stored sample reading from each respective type of sampled operation state with respective stored association information relevant thereto, if such combination information is available, and making respective turbine blade vibration safe operation second confidence level determinations; and combining all prior sequentially determined confidence levels information to derive a turbine blade vibration safe operation overall confidence level; and a steam turbine control system coupled to the steam turbine for causing the steam turbine to vary output load, and coupled to the BVMBLS, the steam turbine control system causing the steam turbine to:

lower turbine load incrementally when any of the BVMBLS sequentially determined confidence levels is below a desired margin of safe operation and increase turbine load incrementally when the BVMBLS overall confidence level determination is indicative of turbine blade vibration safe operation.

12. The system of claim 11, the BVMLS processor performing its defined operation steps in a feedback loop and causing the steam turbine control system to revert to a safe operation range default mode after cessation of the feedback loop performance.

13. The system of claim 11, wherein the previously stored information in the second automated data storage device is updated periodically with additional new information resulting from the BVMBLS processor performing the determining steps.

14. The system of claim 11, further comprising performing one or more additional confidence level determinations after the second confidence level determinations.

15. The system of claim 11, wherein the BVMBLS performs the determining step using any one of fuzzy logic, self-learning, algorithmic, statistical, neural network logic, case-based reasoning or heuristic methods.

16. A system for monitoring and controlling power plant steam turbine blade vibration within a designated safe operation range, limiting backpressure on the blades by altering the turbine output load, comprising:

a plurality of types of sensors coupled to steam power plant equipment for respectively sampling in real time a plurality of types of operation states that impact steam turbine blade vibration, including among others steam turbine blade vibration amplitude and backpressure on the blades;

a blade vibration monitoring backpressure limiting system (BVMBLS) in communication with the plurality of types of sensors, a first automated data storage device, and a second automated data storage device having therein previously stored information associating operation states with steam turbine blade vibration, the BVMBLS including:

means for sampling in real time the plurality of types of sensors;

means for storing in the first automated data storage device at least one sampled data reading for each respective type of operation state;

means for determining in real time a likelihood of whether one or a combination of the respective at least one sampled operation state data readings is indicative of steam turbine blade vibration safe operation, including:

means for referencing in the second automated data storage device the previously stored information associating operation states with steam turbine blade vibration;

means for comparing at least one stored operation state sample reading from each respective type of sampled operation state with respective stored association information relevant thereto and making respective turbine blade vibration safe operation first confidence level determinations;

means for comparing a combination of the at least one stored sample reading from each respective type of sampled operation state with respective stored association information relevant thereto, if such combination information is available, and making respective turbine blade vibration safe operation second confidence level determinations; and means for combining all prior sequentially determined confidence levels information to derive a turbine blade vibration safe operation overall confidence level; and a steam turbine control system coupled to the steam turbine for causing the steam turbine to vary output load, and coupled to the BVMBLS, the steam turbine control system causing the steam turbine to:

lower turbine load incrementally when any of the BVMBLS sequentially determined confidence levels is below a desired margin of safe operation; and increase turbine load incrementally when the BVMBLS overall confidence level determination is indicative of turbine blade vibration safe operation.

17. The system of claim 16, the BVMLS performing its defined operation functions in a feedback loop and causing the steam turbine control system to revert to a safe operation range default mode after cessation of the feedback loop.

18. The system of claim 16, wherein the previously stored information in the second automated data storage device comprises any one of rules, set points, absolute reading limits, historical information, weightings, human inputs or statistical probabilities or additional new association information made by the BVMBLS means for determining is stored in the second automated data storage device.

19. The system of claim 16, wherein the BVMBLS performs the determining step using any one of fuzzy logic, self-learning, algorithmic, statistical, neural network logic, case-based reasoning or heuristic methods.

20. The system of claim 16, further comprising performing one or more additional confidence level determinations after the second confidence level determinations.

\* \* \* \* \*